United States Patent
Goto et al.

(10) Patent No.: US 12,116,688 B2
(45) Date of Patent: Oct. 15, 2024

(54) Ni-PLATED STEEL SHEET, AND METHOD FOR MANUFACTURING Ni-PLATED STEEL SHEET

(71) Applicant: NIPPON STEEL CORPORATION, Tokyo (JP)

(72) Inventors: Yasuto Goto, Tokyo (JP); Kiyokazu Ishizuka, Tokyo (JP); Takehiro Takahashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 43 days.

(21) Appl. No.: 17/776,465

(22) PCT Filed: Dec. 20, 2019

(86) PCT No.: PCT/JP2019/050106
§ 371 (c)(1),
(2) Date: May 12, 2022

(87) PCT Pub. No.: WO2021/100212
PCT Pub. Date: May 27, 2021

(65) Prior Publication Data
US 2022/0403539 A1 Dec. 22, 2022

(51) Int. Cl.
C25D 3/12 (2006.01)
C21D 9/46 (2006.01)
C22C 38/08 (2006.01)
C25D 5/50 (2006.01)

(52) U.S. Cl.
CPC ............... C25D 3/12 (2013.01); C21D 9/46 (2013.01); C22C 38/08 (2013.01); C25D 5/50 (2013.01)

(58) Field of Classification Search
None
See application file for complete search history.

(56) References Cited

U.S. PATENT DOCUMENTS

| | | | |
|---|---|---|---|
| 4,374,682 A * | 2/1983 | Abe | C21D 9/48 148/504 |
| 2006/0083981 A1 | 4/2006 | Mori et al. | |
| 2012/0009464 A1 | 1/2012 | Nakazawa et al. | |
| 2018/0347061 A1 | 12/2018 | Sadaki et al. | |
| 2018/0351138 A1 | 12/2018 | Asada et al. | |
| 2018/0366691 A1 | 12/2018 | Sadaki et al. | |
| 2021/0277234 A1* | 9/2021 | Gopal | D02G 3/449 |

FOREIGN PATENT DOCUMENTS

| | | | |
|---|---|---|---|
| CA | 3078405 A1 | 4/2019 | |
| JP | 2005-078894 A | 3/2005 | |
| JP | 2011-009154 A | 1/2011 | |
| WO | WO-2012153728 A1 * | 11/2012 | ........... B23K 11/163 |
| WO | 2017/094919 A1 | 6/2017 | |
| WO | 2017/094920 A1 | 6/2017 | |
| WO | 2017/094921 A1 | 6/2017 | |

* cited by examiner

Primary Examiner — Kevin R Kruer
(74) Attorney, Agent, or Firm — Renner, Otto, Boisselle & Sklar, LLP

(57) ABSTRACT

A Ni-plated steel sheet includes a base steel sheet and a Ni-based coating layer that is disposed on a surface of the base steel sheet. The distribution of carbon concentration in a depth direction obtained by performing GDS analysis on the Ni-plated steel sheet has a peak indicating the carbon concentration that is equal to or more than twice the carbon concentration of a thickness middle portion of the base steel sheet in the vicinity of an interface between the base steel sheet and the Ni-based coating layer.

8 Claims, 3 Drawing Sheets

Ni-PLATED STEEL SHEET, AND METHOD FOR MANUFACTURING Ni-PLATED STEEL SHEET

TECHNICAL FIELD OF THE INVENTION

The present invention relates to a Ni-plated steel sheet and a method for manufacturing the Ni-plated steel sheet.

RELATED ART

With the widespread use of portable electronic devices and xEVs (general term for EVs, hybrid vehicles, and plug-in hybrid vehicles), there is a demand for smaller-size and larger-capacity batteries which are power sources for portable electronic devices and xEVs. In order to increase the capacity of the battery, a surface-treated steel sheet constituting a battery container requires sufficiently high strength to ensure the strength of the battery even when it has a small thickness. In addition, in order to reduce the size of the battery, the surface-treated steel sheet constituting the battery container requires coating adhesion, processed portion corrosion resistance, and the like. Of course, the steel sheet used as the battery container requires coating adhesion, processed portion corrosion resistance, and the like.

For example, the following have been proposed as steel sheets for batteries.

Patent Document 1 discloses a surface-treated steel sheet for a battery container which includes a steel sheet, an iron-nickel diffusion layer that is formed on the steel sheet, and a nickel layer that is formed on the iron-nickel diffusion layer and constitutes the outermost layer. When Fe strength and Ni strength are continuously measured in a depth direction from a surface of the surface-treated steel sheet for a battery container using a radiofrequency glow discharge optical emission spectrometer, the thickness of the iron-nickel diffusion layer, which is a difference (D2−D1) between a depth (D1) at which the Fe strength indicates a first predetermined value and a depth (D2) at which the Ni strength indicates a second predetermined value, is 0.04 to 0.31 kin, and the total amount of nickel included in the iron-nickel diffusion layer and the nickel layer is 4.4 g/m$^2$ or more and is less than 10.8 g/m$^2$.

Patent Document 2 discloses a surface-treated steel sheet for a battery container which includes a steel sheet, an iron-nickel diffusion layer that is formed on the steel sheet, and a nickel layer that is formed on the iron-nickel diffusion layer and constitutes the outermost layer. When Fe strength and Ni strength are continuously measured in a depth direction from a surface of the surface-treated steel sheet for a battery container using a radiofrequency glow discharge optical emission spectrometer, the thickness of the iron-nickel diffusion layer, which is a difference (D2−D1) between a depth (D1) at which the Fe strength indicates a first predetermined value and a depth (D2) at which the Ni strength indicates a second predetermined value, is 0.04 to 0.31 m, and the total amount of nickel included in the iron-nickel diffusion layer and the nickel layer is 10.8 to 26.7 g/m$^2$.

Patent Document 3 discloses a nickel-plated heat-treated steel sheet for a battery container which includes a nickel layer having a Ni content of 4.4 to 26.7 g/m$^2$ on a steel sheet. When Fe strength and Ni strength are continuously measured in a depth direction from a surface of the nickel-plated heat-treated steel sheet for a battery container using a radiofrequency glow discharge optical emission spectrometer, a difference (D2−D1) between a depth (D1) at which the Fe strength indicates a first predetermined value and a depth (D2) at which the Ni strength indicates a second predetermined value is less than 0.04 μm.

However, even with these techniques, it is not easy to satisfy all of the characteristics required for the steel sheets for batteries in recent years. The inventors considered that it was not possible to sufficiently improve all of the coating adhesion and processed portion corrosion resistance of the Ni-plated steel sheet only by controlling the thickness of the iron-nickel diffusion layer and the Ni coating weight.

PRIOR ART DOCUMENT

Patent Document

[Patent Document 1] PCT International Publication No. WO2017/094919
[Patent Document 2] PCT International Publication No. WO2017/094920
[Patent Document 3] PCT International Publication No. WO2017/094921

DISCLOSURE OF THE INVENTION

Problems to be Solved by the Invention

An object of the invention is to provide a Ni-plated steel sheet having high coating adhesion and thus having high processed portion corrosion resistance and a method for manufacturing the Ni-plated steel sheet.

Means for Solving the Problem

The gist of the invention is as follows.

(1) According to one aspect of the invention, there is provided a Ni-plated steel sheet including a base steel sheet and a Ni-based coating layer that is disposed on a surface of the base steel sheet. The distribution of the carbon concentration in a depth direction obtained by performing glow discharge emission spectrometry on the Ni-plated steel sheet has a peak indicating the carbon concentration that is equal to or more than twice the carbon concentration of a thickness middle portion of the base steel sheet in the vicinity of an interface between the base steel sheet and the Ni-based coating layer.

(2) In the Ni-plated steel sheet according to (1), the distribution of the carbon concentration in the depth direction obtained by performing the glow discharge emission spectrometry on the Ni-plated steel sheet may have a bottom which indicates a carbon concentration equal to or less than 0.8 times the carbon concentration of the thickness middle portion of the base steel sheet and is adjacent to a base steel sheet side of the peak.

(3) In the Ni-plated steel sheet according to (1) or (2), the Ni-based coating layer may include a Fe—Ni alloy region that is disposed on the surface of the base steel sheet and includes 5 mass % or more of Fe and a remainder in which 90 mass % or more of a metal element is Ni and a Ni region that is disposed on the Fe—Ni alloy region and includes less than 5 mass % of Fe and a remainder in which 90 mass % or more of a metal element is Ni, and the peak may be present in the vicinity of an interface between the Fe—Ni alloy region and the base steel sheet.

(4) In the Ni-plated steel sheet according to (1) or (2), the Ni-based coating layer may be a Fe—Ni alloy region that includes 5 mass % or more of Fe and a remainder in which 90 mass % or more of a metal element is Ni, and the peak may be present in the vicinity of an interface between the Fe—Ni alloy region and the base steel sheet.

(5) In the Ni-plated steel sheet according to any one of (1) to (4), a Ni coating weight per one surface of the Ni-based coating layer may be 1.5 to 65 g/m².

(6) The Ni-plated steel sheet according to any one of (1) to (5) may be used as a material for a battery container.

(7) According to another aspect of the invention, there is provided a method for manufacturing the Ni-plated steel sheet according to any one of (1) to (6). The method includes: plating a base steel sheet with Ni to obtain a base Ni-plated steel sheet; performing a preliminary heat treatment on the base Ni-plated steel sheet; and annealing the base Ni-plated steel sheet to alloy the Ni plating. In the preliminary heat treatment, a time when a temperature of the base Ni-plated steel sheet is within a range of 345° C. or higher and 595° C. or lower is set to 30 seconds or longer and 60 seconds or shorter. In the annealing, an average heating rate of the base Ni-plated steel sheet in a range of 595° C. to a maximum heating temperature is set to 16° C./s or more, and the maximum heating temperature of the base Ni-plated steel sheet is set to 650° C. or higher and 850° C. or lower, and a time when the temperature of the base Ni-plated steel sheet exceeds 830° C. is set to 0 seconds or longer and 15 seconds or shorter.

(8) In the method for manufacturing the Ni-plated steel sheet according to (7), in the annealing, the maximum heating temperature of the base Ni-plated steel sheet may be set to 805° C. or lower, and a time when the temperature of the base Ni-plated steel sheet exceeds 800° C. may be set to 0 seconds or longer and 4 seconds or shorter.

Effects of the Invention

According to the invention, it is possible to provide a Ni-plated steel sheet having high coating adhesion and thus having high processed portion corrosion resistance and a method for manufacturing the Ni-plated steel sheet.

BRIEF DESCRIPTION OF THE DRAWINGS

FIG. 5-1 is a schematic diagram showing a time-temperature chart indicating an example of manufacturing conditions of a Ni-plated steel sheet 1 according to an embodiment of the invention.

FIG. 5-2 is a schematic diagram showing a time-temperature chart indicating another example of the manufacturing conditions of the Ni-plated steel sheet 1 according to the embodiment of the invention.

EMBODIMENTS OF THE INVENTION

The inventors found that a Ni-plated steel sheet obtained by alloying Ni plating under specific annealing conditions had a region with a high carbon concentration (carbon-concentrated region) at an interface between a Ni-based coating layer and a base steel sheet and in the vicinity of the interface. The carbon concentration of the carbon-concentrated region was at a level that far exceeds the carbon concentration of the base steel sheet. Further, the Ni-plated steel sheet having the carbon-concentrated region had extremely high coating adhesion.

Figure 2:
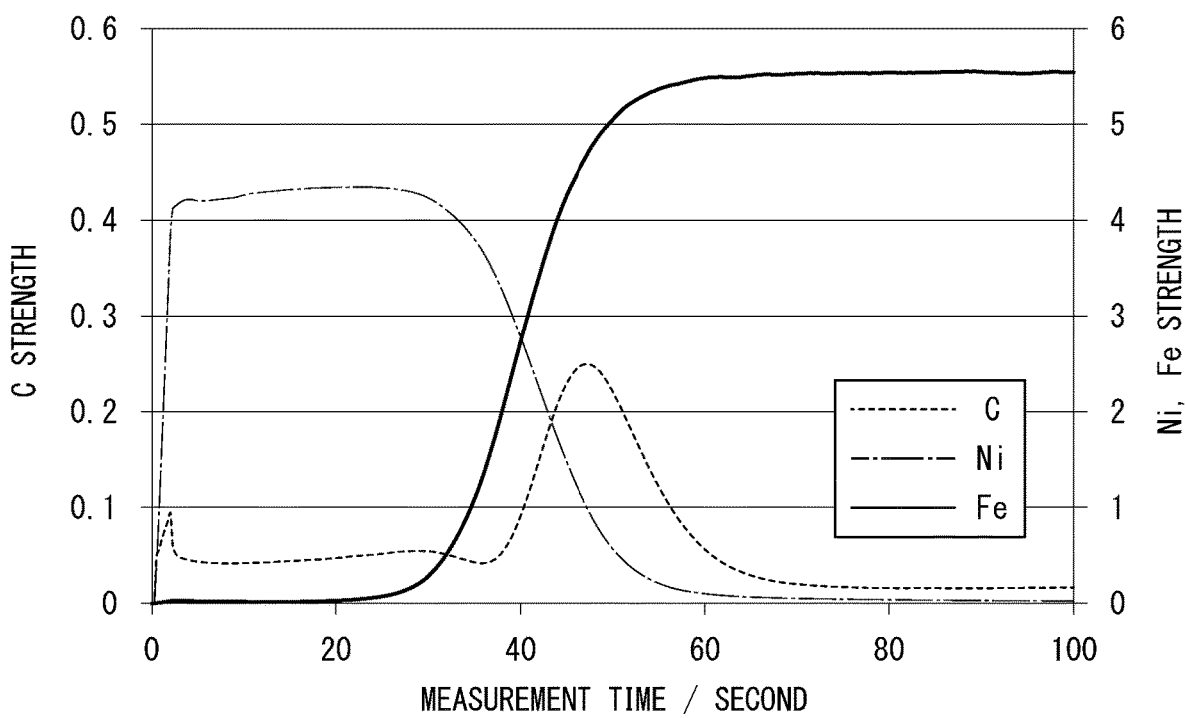
FIG. 2 is a GDS chart showing C strength, Ni strength, and Fe strength distributions of the Ni-plated steel sheet 1 according to the embodiment of the invention.

FIG. 2 is a diagram showing the analysis results of C, Ni, and Fe concentrations in a depth direction obtained by performing glow discharge emission spectrometry (GDS) on the Ni-plated steel sheet. The vertical axis of a graph shown in FIG. 2 is the emission intensity of spectral lines of C, Ni, and Fe and corresponds to the concentrations of C, Ni, and Fe. The horizontal axis is a measurement time (seconds), is equivalent to a sputtering time, and corresponds to the depth of a sample. FIG. 2 shows the analysis result of the Ni-plated steel sheet obtained by performing annealing under the conditions that the time to reach 345° C. or higher is 50 seconds, the maximum heating temperature is 835° C., and the time when the temperature is higher than 830° C. is 10 seconds and performing cooling after Ni plating (the Ni coating weight: 18 g/m²).

A GDS chart of the Ni-plated steel sheet shown in FIG. 2 shows the aspect of the alloying of Ni plating. In FIG. 2, a graph represented by a solid line shows a Fe strength distribution, a graph represented by a one-dot chain line shows a Ni strength distribution, and a graph represented by a broken line shows a C strength distribution. The graphs showing changes in Ni strength and Fe strength gently intersect because alloying by mutual diffusion of Ni in the Ni plating and Fe in the base steel sheet is progressing in the Ni-plated steel sheet. Here, focusing on the analysis results of carbon in the depth direction, a peak of the emission intensity of the spectral line of carbon was clearly shown in a region in which the Ni strength and the Fe strength changed gently. Here, the emission intensity of the spectral line of carbon at the peak shown in FIG. 2 is much greater than that in the base steel sheet. In the technical field of Ni-plated steel sheets, there is no published document at this time that reports this remarkable carbon concentration phenomenon.

A mechanism by which the carbon-concentrated region indicated by the carbon concentration peak is generated and a mechanism by which the carbon-concentrated region improves coating adhesion are not clear at this time. However, the inventors conducted experiments and found that the generation of the carbon-concentrated region was strongly promoted by performing soaking (or heating at a low temperature rising rate) in the temperature range of 345° C. to 595° C. From this fact, the mechanism by which the carbon-concentrated region is generated is inferred as follows.

In the temperature range of 345° C. to 595° C., alloying between the Ni plating and the base steel sheet is unlikely to occur since the diffusion of Ni atoms and Fe atoms is not active. Therefore, in the usual Ni-plated steel sheet alloying treatment, soaking or heating at a low temperature rising rate is not performed within this temperature range. On the other hand, in this temperature range, C atoms in the base steel sheet are likely to be diffused. Therefore, it is presumed that, in a case in which temperature maintenance or a heat treatment equivalent thereto is performed in the temperature range of 345° C. to 595° C. at the time of alloying the Ni-plated steel sheet, carbon included in the base steel sheet is diffused toward the Ni plating which is a region having a low C concentration and is concentrated in the vicinity of the interface between the Ni plating and the base steel sheet. The inventors presume that the carbon-concentrated region is generated by this mechanism.

It is considered that this carbon concentration phenomenon occurs regardless of the amount of carbon in the base steel sheet. The experimental results of the inventors prove that, even when the carbon concentration of the base steel sheet is about 0.0015 mass % (the level of so-called ultra-low carbon steel), it is possible to manufacture the Ni-plated steel sheet 1 having the carbon-concentrated region (in which the carbon concentration peak is detected by GDS analysis).

Figure 1:
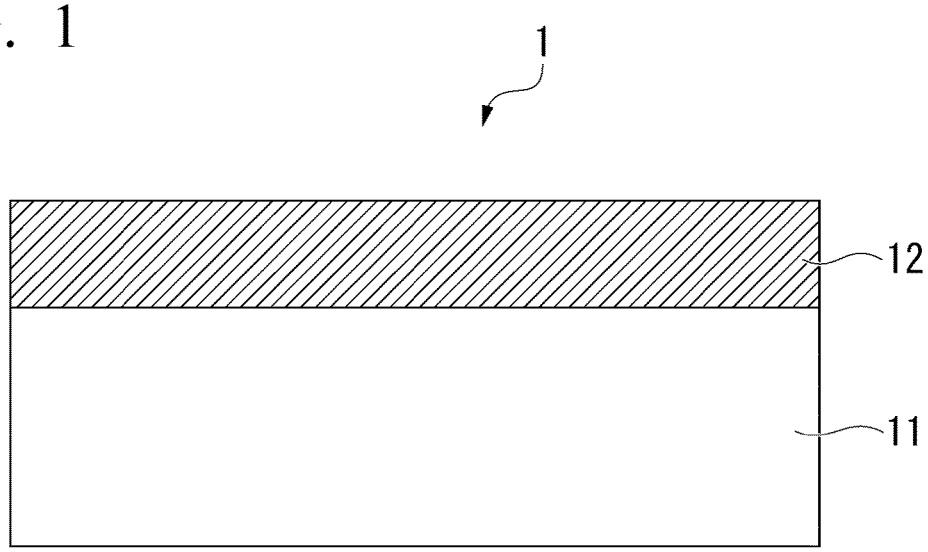
FIG. 1 is a schematic diagram showing a Ni-plated steel sheet 1 according to an embodiment of the invention.

As shown in FIG. 1, the Ni-plated steel sheet 1 according to one aspect of the invention obtained from the above-described findings includes a base steel sheet 11 and a Ni-based coating layer 12 that is disposed on a surface of the base steel sheet 11. The Ni-based coating layer 12 is a coating layer in which a portion or all of the Ni plating is alloyed with Fe in the base steel sheet 11. Here, the distribution of the carbon concentration in the depth direction obtained by performing GDS analysis on the Ni-plated steel sheet 1 according to this embodiment has a peak (hereinafter, referred to as "carbon concentration peak 13") indicating a carbon concentration equal to or more than twice the carbon concentration of a thickness middle portion of the base steel sheet 11 in the vicinity of the interface between the base steel sheet 11 and the Ni-based coating layer 12. Hereinafter, the Ni-plated steel sheet 1 according to this embodiment will be described in detail.

(Base Steel Sheet 11)

The base steel sheet 11 is a steel sheet that serves as a body of the Ni-plated steel sheet 1. For example, the components, thickness, and metallographic structure of the base steel sheet 11 are not particularly limited. In a case in which the base steel sheet 11 is used as a material for a battery container, for example, the base steel sheet 11 may be made of low carbon aluminum killed steel and interstitial free steel (IF steel)/ultra-low carbon steel), or the like. As will be described below, the Ni-plated steel sheet 1 according to this embodiment has the carbon concentration peak 13 presumed to be caused by the diffusion of carbon in the base steel sheet 11. However, even when the base steel sheet 11 is made of low carbon steel, the carbon concentration peak 13 can be formed. Specific examples of the chemical composition (mass %) of the base steel sheet 11 are as follows.

(Example 1) Low Carbon Aluminum Killed Steel

C: 0.057, Si: 0.004, Mn: 0.29, P: 0.014, S: 0.007, and remainder: iron and impurities included (Example 2) IF Steel C: 0.004, Si: 0.01, Mn: 0.16, P: 0.013, S: 0.006, and remainder: iron and impurities included (Example 3) IF Steel C: 0.0012, Si: less than 0.01, Mn: 0.29, P: 0.014, S: less than 0.001, and remainder: iron and impurities included Furthermore, in a case in which the Ni-plated steel sheet 1 is used as the material for a battery container, the thickness of the base steel sheet 11 may be, for example, 0.15 to 0.8 mm.

(Ni-Based Coating Layer 12)

The Ni-based coating layer 12 is a layer obtained by alloying a portion or all of the Ni plating disposed on the surface of the base steel sheet 11 with Fe included in the base steel sheet 11. For example, the average composition and thickness of the Ni-based coating layer 12 are not particularly limited and can be appropriately set according to the use of the Ni-plated steel sheet 1. Further, the Ni-based coating layer 12 may be disposed only on one surface of the base steel sheet 11 or may be disposed on both surfaces.

For example, the average composition of the Ni-based coating layer 12 may include Ni: 95 to 50 mass %, Fe: 5 to 50 mass %, and impurities. In addition, the Ni-based coating layer 12 may further include alloying elements, such as Co, Sn, Zn, W, Mo, and Cr, in order to improve mechanical properties.

The Ni coating weight per one surface of the Ni-based coating layer 12 may be 1.5 to 65 $g/m^2$. It is preferable that the Ni coating weight in the Ni-based coating layer 12 is 1.5 $g/m^2$ or more. In this case, it is possible to reliably ensure the corrosion resistance of the Ni-plated steel sheet 1. It is preferable that the Ni coating weight in the Ni-based coating layer 12 is 65 $g/m^2$ or less. In this case, it is possible to reduce the manufacturing cost of the Ni-plated steel sheet 1. The Ni coating weight per one surface of the Ni-based coating layer 12 may be 2.4 $g/m^2$ or more, 4.8 $g/m^2$ or more, or 8 $g/m^2$ or more. The Ni coating weight per one surface of the Ni-plated steel sheet 1 may be 32 $g/m^2$ or less, 24 $g/m^2$ or less, or 12 $g/m^2$ or less.

The thickness of the Ni-based coating layer 12 may be 0.2 to 7 µm. It is preferable that the thickness of the Ni-based coating layer 12 is 0.2 µm or more. In this case, it is possible to reliably ensure the corrosion resistance of the Ni-plated steel sheet 1. It is preferable that the thickness of the Ni-based coating layer 12 is 7 µm or less. In this case, it is possible to reduce the manufacturing cost of the Ni-plated steel sheet 1. The thickness of the Ni-based coating layer 12 may be 0.3 µm or more, 0.6 µm or more, or 1 µm or more. The thickness of the Ni-based coating layer 12 may be 4 µm or less, 3 µm or less, or 1.5 µm or less.

The Ni coating weight in the Ni-based coating layer 12 can be measured by, for example, an ICP analysis method. First, the Ni-based coating layer 12 having a predetermined area is dissolved with an acid. Then, the total amount of Ni included in a solution is quantitatively analyzed by ICP. The total amount of Ni quantified by ICP can be divided by the above-described predetermined area to calculate the Ni coating weight per unit area. The average composition of the Ni-based coating layer 12 is also calculated by the ICP analysis method. The thickness of the Ni-based coating layer 12 is calculated by polishing a cross section perpendicular to a rolled surface of the Ni-plated steel sheet 1, taking SEM photographs of arbitrary five points of the cross section, and averaging the thicknesses of the Ni-based coating layer 12 measured in each of the SEM photographs.

(Carbon Concentration Peak 13)

The carbon-concentrated region is formed in a region in the vicinity of the interface between the base steel sheet 11 and the Ni-based coating layer 12 and is indicated by the carbon concentration peak 13 recognized in the distribution of the carbon concentration in the depth direction obtained by performing GDS analysis on the Ni-plated steel sheet 1. The carbon concentration peak 13 is defined as a peak indicating a carbon concentration that is equal to or more than twice the carbon concentration of the thickness middle portion of the base steel sheet 11. The thickness middle portion of the base steel sheet 11 means a portion having a depth that is half the thickness of the base steel sheet 11 from the surface (rolled surface) of the base steel sheet 11. However, the carbon concentration of a region in which the carbon concentration is saturated may be regarded as the carbon concentration of the thickness middle portion, which will be described below. The interface between the base steel sheet 11 and the Ni-based coating layer 12 is defined as an interface between the base steel sheet 11 and a region (a Fe—Ni alloy region which will be described below) including 5 mass % or more of Fe and a remainder in which 90 mass % or more of the metal element is Ni. The region in the vicinity of the interface between the base steel sheet 11 and the Ni-based coating layer 12 is defined as a region within 1 m from the interface toward the Ni-based coating layer.

The carbon-concentrated region indicated by the carbon concentration peak 13 gives high coating adhesion to the Ni-plated steel sheet 1, whose detailed mechanism is not clear. The above-mentioned effect was not obtained in a case in which the concentration of carbon did not occur sufficiently and the peak was not recognized in the distribution of carbon concentration in the depth direction or in a case in which the peak was recognized in the distribution of carbon concentration in the depth direction, but the carbon concentration indicated by the peak was less than twice the carbon concentration of the thickness middle portion of the base steel sheet 11. Therefore, the carbon concentration peak 13 is defined as described above.

(Carbon Concentration Bottom 14)

In the Ni-plated steel sheet 1, the distribution of carbon concentration in the depth direction obtained by performing GDS analysis on the Ni-plated steel sheet 1 may have a carbon concentration bottom 14 that is adjacent to the base steel sheet side of the carbon concentration peak 13. The carbon concentration bottom 14 is defined as a bottom having a carbon concentration that is equal to or less than 0.8 times the carbon concentration of the thickness middle portion of the base steel sheet 11. It is considered that this carbon-deficient region is generated by the remarkable diffusion of carbon from the base steel sheet 11 toward the Ni-based coating layer 12.

Figure 3:
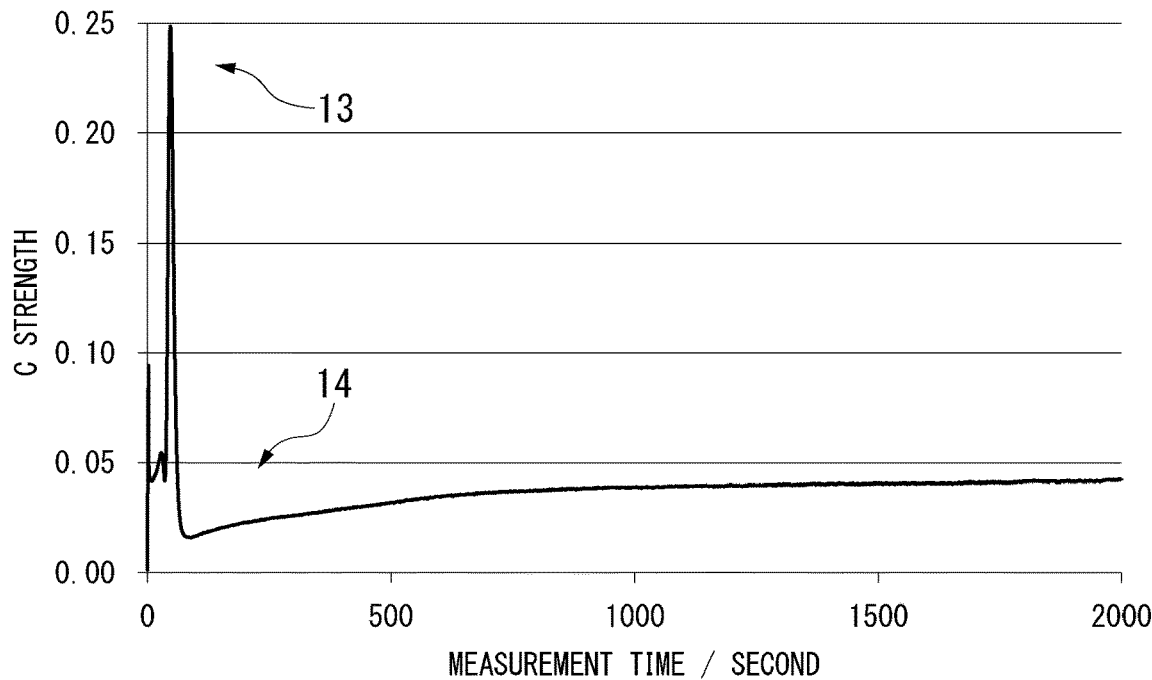
FIG. 3 is a GDS chart showing the C strength distribution of the Ni-plated steel sheet 1 according to the embodiment of the invention.

FIG. 3 shows the analysis results of the carbon concentration in the depth direction in a case in which the GDS analysis is performed for a very long time. In a chart shown in FIG. 3, the valley of the emission intensity of the spectral line of carbon is clearly shown in addition to the peak of the emission intensity of the spectral line of carbon (carbon concentration peak 13). In a case in which the diffusion of carbon from the base steel sheet 11 to the Ni-based coating layer 12 is very remarkable, the valley of the emission intensity is the carbon concentration bottom 14 indicating a carbon concentration that is equal to or less than 0.8 times the carbon concentration of the thickness middle portion of the base steel sheet.

The findings obtained as a result of the experiments repeated by the inventors show that the Ni-plated steel sheet 1 in which the base steel sheet 11 has the carbon-deficient region indicated by the carbon concentration bottom 14 has higher processed portion corrosion resistance. The mechanism by which the carbon-deficient region improves the workability of the Ni-plated steel sheet 1 is not clear. The inventors presume that the carbon-deficient region softens the surface of the base steel sheet 11 (the vicinity of the interface between the base steel sheet 11 and the Ni-based coating layer 12) to improve the workability of the Ni-plated steel sheet 1, thereby suppressing the coating damage of the processed portion and improving the processed portion corrosion resistance.

In addition, the carbon concentration bottom 14 tends to have a large width. The experimental results of the inventors proved that the width of the carbon concentration bottom 14 was often 3 μm or more. Therefore, in a case in which the region having a carbon concentration that is equal to or less than 0.8 times the carbon concentration of the thickness middle portion of the base steel sheet is defined as the carbon-deficient region, the thickness of the carbon-deficient region may be defined as 3 μm or more.

Whether or not the carbon concentration peak 13 and the carbon concentration bottom 14 are present can be determined by GDS analysis. Specifically, first, the surface of the Ni-plated steel sheet 1 is cleaned. Then, GDS analysis is performed from the surface of the Ni-plated steel sheet 1 to the base steel sheet 11. Then, for example, the charts shown in FIGS. 2 and 3 indicating a change in the emission intensity of the spectral line of carbon from the surface of the Ni-plated steel sheet 1 to the base steel sheet 11 are obtained. The emission intensity of the spectral line of carbon at the peak of the chart can be compared with the emission intensity of the spectral line of carbon in the thickness middle portion of the base steel sheet 11 to determine whether or not the carbon concentration at the peak of the chart is equal to or more than twice the carbon concentration of the thickness middle portion of the base steel sheet 11. Similarly, the emission intensity of the spectral line of carbon concentration in a portion in which the emission intensity of the spectral line of carbon is the lowest in the range corresponding to the base steel sheet 11 can be compared with the emission intensity of the spectral line of carbon in the thickness middle portion of the base steel sheet 11 to determine whether or not the carbon concentration in the portion is equal to or less than 0.8 times the carbon concentration of the thickness middle portion of the base steel sheet 11. In addition, the width of the carbon-deficient region can be calculated on the basis of the shape of the chart. In the graphs shown in FIGS. 2 and 3, it is presumed that the peak of the emission intensity of the spectral line of carbon is seen even immediately after the start of the GDS analysis, which is caused by the contamination of the surface of the Ni-plated steel sheet or noise. Therefore, the peak immediately after the start of the GDS analysis is ignored in the determination of whether or not the carbon concentration peak 13 is present.

In addition, the specific conditions of the GDS analysis are as follows. Measurement was performed under the conditions of an output of 30 W, an Ar pressure of 3 hPa, and an analysis area of 4 mmφ, using the high frequency mode of GDA750 manufactured by Rigaku Corporation. The digging depth of a sample after the measurement was actually measured with a laser microscope, and the relationship between the measurement (sputter) time and the thickness was calculated.

In a case in which the thickness of the base steel sheet 11 is large, it is difficult to perform the GDS analysis up to the thickness middle portion. In this case, the emission intensity in a portion in which the emission intensity of carbon is saturated during the GDS analysis may be regarded as the emission intensity of carbon in the thickness middle portion. However, in this case, it is necessary to determine whether or not the emission intensity of carbon is saturated after performing the GDS analysis up to a sufficient depth. This is because the carbon concentration bottom 14 is likely to be formed in the base steel sheet 11 as shown in FIG. 3. In a case in which the GDS analysis ends in a short time, that is, in a case in which the GDS analysis is performed only in a shallow region of the Ni-plated steel sheet 1, there is a concern that the carbon concentration bottom 14 will be mistaken as the portion in which the emission intensity of carbon is saturated. According to the experimental results of the inventors, it is considered that, when the GDS analysis is performed at about 30 to 40 µm or more, the influence of the carbon concentration bottom 14 is avoided and a saturation point of the emission intensity can be accurately determined.

It is considered that, as a result of performing the GDS analysis at 5 points, the Ni-plated steel sheet in which the carbon concentration peak 13 indicating a carbon concentration equal to or more than twice the carbon concentration of the thickness middle portion of the base steel sheet is detected at four or more points has the carbon-concentrated region of the Ni-plated steel sheet 1 according to this embodiment. Similarly, it is considered that, as a result of performing the GDS analysis at 5 points, the Ni-plated steel sheet in which the carbon concentration bottom 14 having a carbon concentration equal to or less than 0.8 times the carbon concentration of the thickness middle portion of the base steel sheet 11 is detected at four or more points has the carbon-deficient region of the Ni-plated steel sheet 1 according to this embodiment.

(Fe—Ni Alloy Region and Ni Region)

The Ni-based coating layer 12 is a layer obtained by alloying a portion or all of the Ni plating as described above. The Ni-based coating layer 12 obtained by alloying a portion of the Ni plating has a Fe—Ni alloy region that is disposed on the surface of the base steel sheet 11 and a Ni region that is disposed on the Fe—Ni alloy region. The entire Ni-based coating layer 12 obtained by alloying the entire Ni plating is the Fe—Ni alloy region.

The Fe—Ni alloy region is defined as a layer that includes 5 mass % or more of Fe and a remainder in which 90 mass % or more of the metal element is Ni. The Fe—Ni alloy region may further include elements other than Fe and Ni (for example, Co and the like) as long as the above-described prescriptions are met. In addition, the Fe—Ni alloy region is also permitted to include impurities.

The thickness of the Fe—Ni alloy region is not particularly limited and can be appropriately selected within a normal range. It is preferable that the thickness of the Fe—Ni alloy region is 0.2 µm or more from the viewpoint of ensuring the coating adhesion and processed portion corrosion resistance of the Ni-plated steel sheet 1. However, when the alloying is advanced too much, there is a concern that the carbon concentration peak will disappear. Therefore, the thickness of the Fe—Ni alloy region may be defined as 1 µm or less.

The Ni region is defined as a layer that includes less than 5 mass % of Fe and a remainder in which 90 mass % or more of the metal element is Ni. The Ni region may further include an element, such as Co, in order to improve the mechanical properties of the Ni region. In a case in which the Ni-plated steel sheet 1 includes both the Fe—Ni alloy region and the Ni region, the Ni region is changed into a soft recrystallized Ni layer by annealing. The soft Ni region follows the distortion of the steel sheet at the time of machining, such as press forming, and prevents the base steel sheet 11 from being exposed. Therefore, the Ni region can further improve the processed portion corrosion resistance of the Ni-plated steel sheet 1.

The thickness of the Ni region is not particularly limited and can be appropriately selected within a normal range. A plated layer of the Ni-plated steel sheet 1 may be completely alloyed (that is, Fe may be diffused up to the surface of the Ni-plated steel sheet 1 and the concentration of Fe in the surface may be 5 mass % or more). In this case, the thickness of the Ni region is considered to be 0 µm. On the other hand, it is preferable that the thickness of the Ni region is 0.8 µm or more from the viewpoint of ensuring the workability of the Ni-plated steel sheet 1. Further, it is considered that the effect of improving workability by the Ni region is saturated when the thickness of the Ni region exceeds about 6.8 µm. Therefore, it is preferable that the thickness of the Ni region is 6.8 µm or less from the viewpoint of economy.

The thickness of the Fe—Ni alloy region and the thickness of the Ni region can be checked by performing linear analysis on the cross section along a sheet thickness direction using a TEM that can analyze elements using EDS or an FE-SEM with a STEM mode that can analyze elements using EDS. A portion that includes 5% or more of Fe and a remainder in which 90% or more of the metal element is Ni is defined as the Fe—Ni alloy region of a Ni containing layer, and a portion that includes less than 5% of Fe and a remainder in which 90% or more of the metal element is Ni is defined as the Ni region. The thickness can be measured by the following procedure. A sample which has been subjected to foil processing by FIB and whose cross section along the sheet thickness direction can be observed is quantitatively analyzed using the TEM that can analyze elements using EDS and the FE-SEM with a STEM mode that can analyze elements using EDS, and a region that meets the requirements of each of the defined regions is determined. Then, the thickness of the region along the sheet thickness direction is measured.

The use of the Ni-plated steel sheet 1 according to this embodiment is not particularly limited. The Ni-plated steel sheet 1 according to this embodiment has high coating adhesion and high processed portion corrosion resistance. Therefore, it is preferable to use the Ni-plated steel sheet 1 according to this embodiment as a steel sheet for a battery container because it contributes to extending the life of the battery.

The Ni-plated steel sheet 1 according to this embodiment, which has the carbon-concentrated region (the carbon concentration peak 13 as a result of GDS analysis) has high coating adhesion. Further, in the Ni-plated steel sheet 1 according to this embodiment has high processed portion corrosion resistance because of high coating adhesion. In a case in which the Ni-plated steel sheet 1 has the carbon-deficient region (the carbon concentration bottom 14 as a result of GDS analysis), it has higher processed portion corrosion resistance.

(Manufacturing Method)

Next, a preferable method for manufacturing the Ni-plated steel sheet 1 according to this embodiment will be described. According to the following manufacturing method, it is possible to suitably obtain the Ni-plated steel sheet 1 according to this embodiment. However, a Ni-plated steel sheet having the above-mentioned requirements is considered to be the Ni-plated steel sheet 1 according to this embodiment, regardless of the method for manufacturing the Ni-plated steel sheet. That is, the following manufacturing conditions do not limit the range of the Ni-plated steel sheet 1 according to this embodiment.

Figure 4:
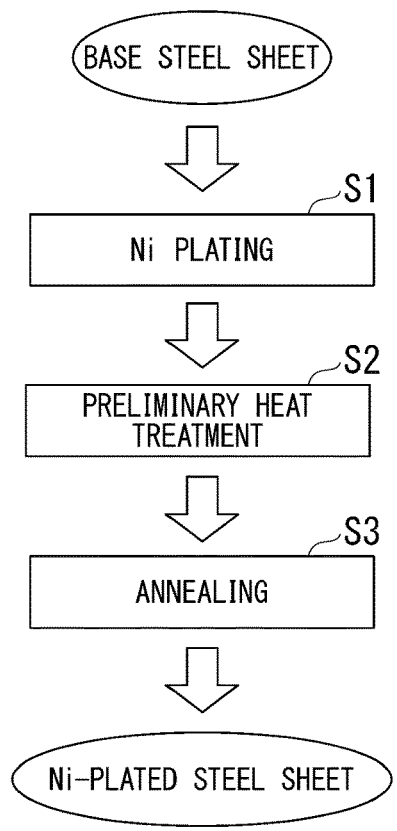
FIG. 4 is a flowchart showing a method for manufacturing the Ni-plated steel sheet 1 according to the embodiment of the invention.

As shown in FIG. 4, the method for manufacturing the Ni-plated steel sheet 1 according to this embodiment includes a step S1 of plating the base steel sheet 11 with Ni to obtain a base Ni-plated steel sheet and a step S2 of performing a preliminary heat treatment on the base Ni-plated steel sheet, and a step S3 of annealing the base Ni-plated steel sheet to alloy the Ni plating.

In the Ni plating step S1, the base steel sheet 11 is plated with Ni. In this embodiment, an unalloyed Ni-plated steel sheet obtained after the Ni plating is referred to as a base Ni-plated steel sheet. A Ni plating method is not particularly limited. It is preferable to use electrolytic Ni plating as the Ni plating in terms of operational efficiency. Further, Ni plating conditions are not particularly limited. It is preferable that components and current conditions of a plating bath are set such that the Ni coating weight per one surface is 1.5 to 65 g/m² (the average Ni plating thickness of the base Ni-plated steel sheet is about 0.2 to 7 μm).

In the preliminary heat treatment step S2, a heat treatment is performed on the base Ni-plated steel sheet. In this heat treatment, the time when the temperature of the base Ni-plated steel sheet is within the range of 345° C. or higher and 595° C. or lower is set to 30 seconds or longer and 60 seconds or shorter. It is presumed that, in the temperature range of 345° C. or higher and 595° C. or lower, mutual diffusion of Ni and iron does not occur substantially, but the diffusion of C occurs from the base steel sheet to the Ni plating, which results in the concentration of C in the vicinity of the interface between the Ni plating and the base steel sheet. Therefore, it is presumed that the carbon-concentrated region is formed by promoting the concentration of C while suppressing the mutual diffusion of Ni and iron in the preliminary heat treatment S2. The time when the temperature of the base Ni-plated steel sheet is within the range of 345° C. or higher and 595° C. or lower is set to 30 seconds or longer from the viewpoint of promoting the concentration of C. On the other hand, when the temperature retention time in the range of 345° C. or higher and 595° C. or lower is too long, there is a concern that C diffused to the Ni plating will be further diffused to the surface of the Ni plating and the carbon concentration peak will disappear. From the viewpoint of preventing the excessive diffusion of C, the time when the temperature of the base Ni-plated steel sheet is within the range of 345° C. or higher and 595° C. or lower is set to 60 seconds or shorter.

Figures 1, 5:
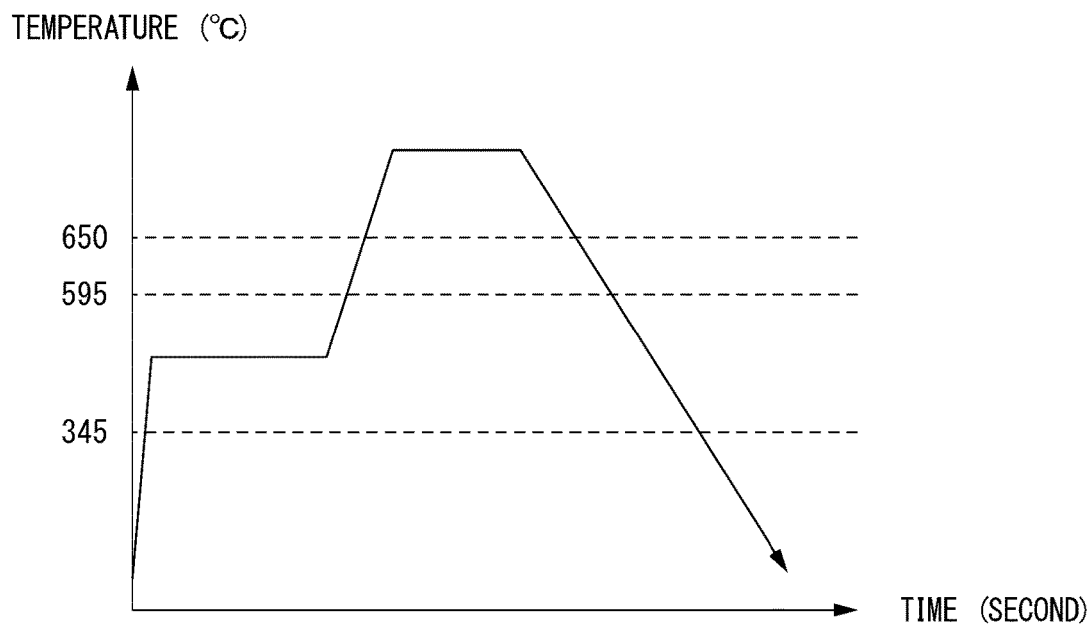
Figures 2, 5:
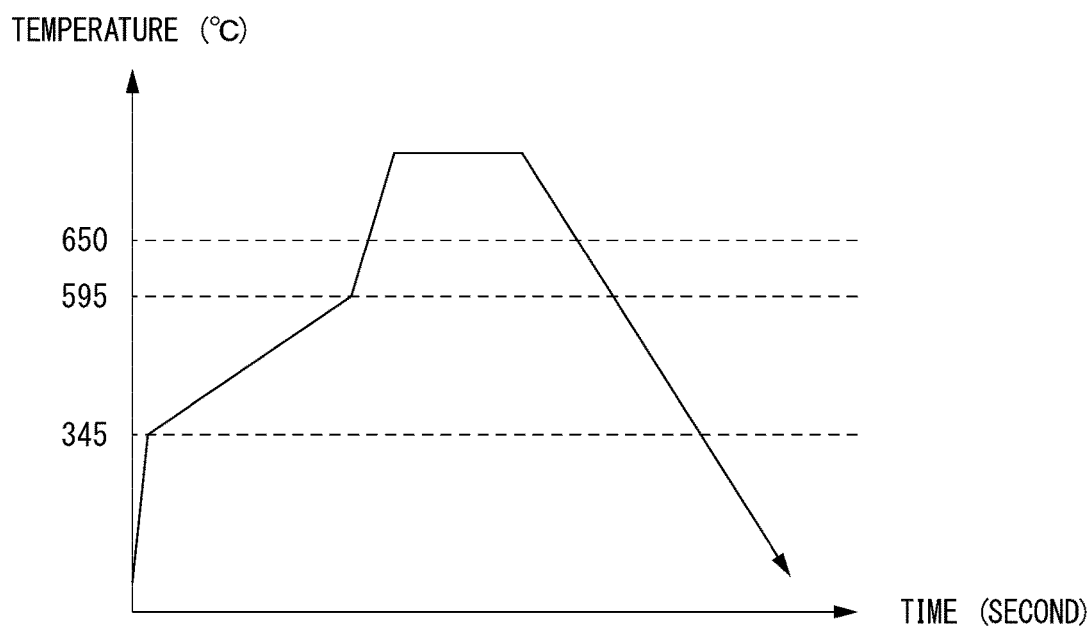

Further, as shown in FIG. 5-1, the temperature of the base Ni-plated steel sheet may be kept constant within the range of 345° C. or higher and 595° C. or lower. On the other hand, as shown in FIG. 5-2, the temperature of the base Ni-plated steel sheet may be gradually raised within the range of 345° C. or higher and 595° C. or lower. In any case, the carbon-concentrated region can be provided in the Ni-plated steel sheet as long as the time when the temperature of the base Ni-plated steel sheet is 345° C. or higher and 595° C. or lower is 30 seconds or longer and 60 seconds or shorter.

In the annealing step S3, the base Ni-plated steel sheet subjected to the preliminary heat treatment is further heated, and the temperature of the base Ni-plated steel sheet is maintained for a predetermined period of time. Then, the base Ni-plated steel sheet is cooled. In this way, the base Ni-plated steel sheet is annealed. Ni constituting the Ni plating and iron constituting the base steel sheet are mutually thermally diffused by the annealing to form the Ni-based coating layer 12. In the annealing, the Ni-plated steel sheet 1 without the Ni region can be manufactured by completely alloying the Ni plating of the base Ni-plated steel sheet (that is, diffusing iron in the base steel sheet 11 to the surface of the Ni plating), and the Ni-plated steel sheet 1 with the Ni region can be manufactured by alloying a portion of the Ni plating of the base Ni-plated steel sheet (that is, by not diffusing iron in the base steel sheet 11 to the surface of the Ni plating).

In the annealing step S3, the average heating rate of the base Ni-plated steel sheet in the range of 595° C. to the maximum heating temperature (see FIGS. 5-1 and 5-2) is set to 16° C./s or more, the maximum heating temperature of the base Ni-plated steel sheet is set to 650° C. or higher and 850° C. or lower, and the time when the temperature of the base Ni-plated steel sheet exceeds 830° C. is 0 seconds or longer and 15 seconds or shorter. These conditions are for preventing carbon diffused to the Ni-based coating layer 12 from being further diffused to the surface of the Ni-plated steel sheet 1. In addition, the "average heating rate of the base Ni-plated steel sheet in the range of 595° C. to the maximum heating temperature" is a value obtained by dividing the value obtained by subtracting 595 from the maximum heating temperature by the time required to raise the temperature of the base Ni-plated steel sheet from 595° C. to the maximum heating temperature.

The carbon concentrated in the vicinity of the interface between the Ni-based coating layer 12 and the base steel sheet 11 is further diffused to the surface side of the Ni-plated steel sheet 1 by performing heating for a long time in a high temperature range and temperature maintenance. As a result, there is a concern that the carbon concentration peak 13 generated in the Ni-based coating layer 12 will disappear. The above-mentioned annealing conditions were set in view of the need to keep the temperature in the high temperature range to a minimum. It is preferable that the maximum heating temperature of the base Ni-plated steel sheet is set to 805° C. or lower and the time when the temperature of the base Ni-plated steel sheet exceeds 800° C. is set to 0 seconds or longer and 4 seconds or shorter.

Further, in the annealing step S3, the maximum heating temperature of the base Ni-plated steel sheet may not exceed 830° C. In this case, the time when the temperature of the base Ni-plated steel sheet exceeds 830° C. is considered to be 0 seconds.

EXAMPLES

The effects of one aspect of the invention will be described in more detail using examples. However, the conditions in the examples are only one condition example adopted for confirming the feasibility and effects of the invention. The invention is not limited to the one condition example. The invention may adopt various conditions as long as the object of the invention is achieved without departing from the gist of the invention.

Various Ni-plated steel sheets were manufactured under the conditions described below.

The base steel sheet was assumed to have chemical composition shown in Table 1. The thickness of each steel sheet was 0.3 mm. These base steel sheets were plated with Ni under the conditions shown in Table 2. A Ni plating bath was adjusted to pH=3.5 and a bath temperature of 50° C., and an anode was soluble Ni. The Ni coating weight was controlled by the electrolysis time on the basis of a current density of 1 kA/m².

TABLE 1

| Steel type | C | Si | Mn | P | S |
|---|---|---|---|---|---|
| Steel sheet 1 | 0.057 | 0.004 | 0.29 | 0.014 | 0.007 |
| Steel sheet 2 | 0.004 | 0.01 | 0.16 | 0.013 | 0.006 |
| Steel sheet 3 | 0.0012 | <0.01 | 0.29 | 0.014 | <0.001 |

Balance of Fe and impurities

TABLE 2

| Bath components | Concentration (g/l) |
|---|---|
| Nickel sulfate hexahydrate | 240 |
| Nickel chloride hexahydrate | 30 |
| Boric acid | 30 |

The base Ni-plated steel sheet after the Ni plating was annealed under the heating conditions shown in Table 3.

TABLE 3

|  | Ex. No. | Steel type | Time in the range of 345° C. to 595° C. (sec) | Average heating rate in the range of 595° C. to the maximum heating temperature (° C./sec) | Maximum heating temperature (° C.) | Time when the temperature exceeds 830° C. (sec) | Remarks |
|---|---|---|---|---|---|---|---|
| Example | A1 | Steel sheet 1 | 35 | 17 | 680 | 0 | |
|  | A2 | Steel sheet 1 | 40 | 37 | 835 | 10 | |
|  | A3 | Steel sheet 1 | 55 | 23 | 835 | 15 | |
|  | A4 | Steel sheet 1 | 60 | 16 | 805 | 0 | Exceeding 800° C., 4 seconds |
|  | A5 | Steel sheet 1 | 60 | 16 | 805 | 0 | Exceeding 800° C., 6 seconds |
|  | A6 | Steel sheet 1 | 40 | 37 | 835 | 10 | |
|  | A7 | Steel sheet 1 | 40 | 37 | 835 | 10 | |
|  | A8 | Steel sheet 1 | 40 | 37 | 835 | 10 | |
|  | A9 | Steel sheet 1 | 40 | 37 | 835 | 10 | |
|  | A10 | Steel sheet 1 | 40 | 37 | 835 | 10 | |
|  | A11 | Steel sheet 1 | 40 | 37 | 835 | 10 | |
|  | A12 | Steel sheet 1 | 40 | 37 | 835 | 10 | |
|  | A13 | Steel sheet 1 | 40 | 37 | 835 | 10 | |
|  | A14 | Steel sheet 2 | 40 | 37 | 835 | 10 | |
|  | A15 | Steel sheet 3 | 40 | 37 | 835 | 10 | |
| Comparative Example | B1 | Steel sheet 1 | 25 | 30 | 835 | 10 | |
|  | B2 | Steel sheet 1 | 70 | 64 | 835 | 10 | |
|  | B3 | Steel sheet 1 | 25 | — | 520 | 0 | |
|  | B4 | Steel sheet 1 | 90 | 34 | 835 | 15 | |
|  | B5 | Steel sheet 1 | 25 | — | 350 | 0 | |
|  | B6 | Steel sheet 1 | 90 | 92 | 855 | 180 | |
|  | B7 | Steel sheet 1 | 90 | 128 | 835 | 190 | |
|  | B8 | Steel sheet 1 | 0 | — | 340 | 0 | Maintain 200 seconds at 340° C. |
|  | B9 | Steel sheet 1 | 40 | 15 | 835 | 10 | |

For the Examples in which the maximum heating temperature was less than 595° C., the "average heating rate in the range of 595° C. to the maximum heating temperature" is filled with "-".

In addition, the other annealing conditions that are not shown in Table 3 are as follows. An annealing atmosphere was $N_2$-2% $H_2$. The base Ni-plated steel sheet was cooled from the maximum heating temperature with an in-furnace atmosphere gas, and it was confirmed that the temperature of the steel sheet was 300° C. or lower. Then, the base Ni-plated steel sheet was taken out of the furnace.

Various Ni-plated steel sheets obtained by the above-mentioned way were evaluated as follows. The evaluation results are shown in Table 4.

(1) Determination of Whether or not Carbon-Concentrated Region is Present

Whether or not the carbon-concentrated region was present was determined on the basis of the presence or absence of the carbon concentration peak 13 clarified by GDS analysis. Specifically, first, the surface of the Ni-plated steel sheet 1 was cleaned. Then, GDS analysis was performed from the surface of the Ni-plated steel sheet 1 to the base steel sheet 11. As a result, a chart showing a change in the emission intensity of the spectral line of carbon from the surface of the Ni-plated steel sheet 1 to the base steel sheet 11 was obtained. The emission intensity of the spectral line of carbon at the peak of the chart was compared with the emission intensity of the spectral line of carbon in the thickness middle portion of the base steel sheet 11 to determine whether the carbon concentration at the peak was equal to or more than twice the carbon concentration of the thickness middle portion of the base steel sheet 11. In addition, in some cases, the peak occurred due to the contamination of the surface of the Ni-plated steel sheet or noise even immediately after the start of the GDS analysis. However, this was ignored in the determination of whether or not the carbon concentration peak 13 was present. A Ni-plated steel sheet in which the carbon concentration at the peak of the chart was equal to or more than twice the carbon concentration of the thickness middle portion of the base steel sheet 11 was determined to be the Ni-plated steel sheet having the carbon-concentrated region.

(2) Determination of Whether or not Carbon-Deficient Region is Present

Whether or not the carbon-deficient region was present was also determined on the basis of the presence or absence of the carbon concentration bottom 14 clarified by GDS analysis, as in the case of the carbon concentration peak 13. That is, first, a chart showing a change in the emission intensity of the spectral line of carbon from the surface of the Ni-plated steel sheet 1 to the base steel sheet 11 was obtained. The emission intensity of the spectral line of carbon concentration at the bottom of the chart was compared with the emission intensity of the spectral line of carbon in the thickness middle portion of the base steel sheet 11 to determine whether or not the carbon concentration at the bottom of the chart was equal to or less than 0.8 times the carbon concentration of the thickness middle portion of the base steel sheet 11. A Ni-plated steel sheet in which the carbon concentration at the bottom of the chart was equal to or less than 0.8 times the carbon concentration of the thickness middle portion of the base steel sheet 11 was determined to be the Ni-plated steel sheet having the carbon-deficient region.

(3) Measurement of Thickness of Fe—Ni Alloy Region and Ni Region

The thickness of the Fe—Ni alloy region and the thickness of the Ni region were checked by performing linear analysis on the cross section along the sheet thickness direction using the FE-SEM with a STEM mode that can analyze elements with EDS. A portion including 5% or more of Fe and a remainder in which 90% or more of the metal element was Ni was defined as the Fe—Ni alloy region of the Ni containing layer, and a portion including less than 5% of Fe and a remainder in which 90% or more of the metal element was Ni was defined as the Ni region. The thickness was measured by determining a region meeting the requirements of each of the defined regions and measuring the thickness of the region along the sheet thickness direction. The distance between the regions were measured at 5 points, and the average value of the distances was listed in the table as the thickness of the Fe—Ni alloy region of the Ni-plated steel sheet 1. Further, the distance between the surface of the Ni-plated steel sheet 1 and the interface between the Ni region and the Fe—Ni alloy region was measured at five points, and the average value of the distances was listed in the table as the thickness of the Ni region of the Ni-plated steel sheet 1.

(4) Measurement of Ni Coating Weight

The Ni coating weight in the Ni-plated steel sheet 1 was measured by an ICP analysis method. First, the Fe—Ni alloy region and the Ni region having an area of 2500 mm$^2$ (50 mm square) are dissolved with an acid. Then, the total amount of Ni included in a solution is quantitatively analyzed by ICP. The Ni coating weight per unit area was calculated by dividing the total amount of Ni quantified by ICP by the area of the above-mentioned region to be measured.

(5) Evaluation of Ni-Based Coating Adhesion in Processed Portion

A test piece having a sheet thickness of 0.3 mmt was sheared into a size of 60 mm×30 mm in order to evaluate the Ni-based coating adhesion in the processed portion. Here, a long side having a length of 60 mm was parallel to a rolling direction (L direction) of the test piece, and a short side having a length of 30 mm was parallel to a direction (C direction) perpendicular to the rolling direction of the test piece. 1T bending was performed on the test piece, using a portion that was 30 mm away from an end portion in the L direction as the center. 1T bending means bending the test piece 180 degrees in a state in which one steel sheet having the same thickness (that is, 0.3 mm) as the test piece is placed inside the test piece to be tested in a bending direction. A secondary electron image of the outside of the 180-degree bent portion of the test piece was captured in three visual fields at a magnification of 200-fold using the SEM, and the peeling and cracking of Ni-based coating in an observed visual field with an area equivalent to 100 μm$^2$ or more were specified by image analysis. A case in which a total of 10 or more peels and cracks were observed per 1 mm$^2$ was represented by "Bad (B)" in the table. A case in which the total number of peels and cracks was 1 to 9 or less per 1 mm$^2$ was represented by "Good (G)" in the table, and a case in which the total number of peels and cracks was 0 was represented by "Very Good (VG)" in the table. Here, "G" and "VG" were accepted.

(6) Evaluation of Processed Portion Corrosion Resistance

The evaluation of the corrosion resistance was performed using a pressed product after cylindrical press forming only in a case in which the evaluation of the Ni-based coating adhesion of the processed portion was passed. A 4-stage transfer press was used as the press, and the final shape was a cylindrical can with a diameter of 18 mm and a height of 50 mm. Test conditions for corrosion resistance evaluation were that a relative humidity of 95% and a temperature of 60° C. were maintained, and whether or not red rust was formed was visually checked on the 5th, 10th, and 20th days. As evaluation criteria, a case in which red rust was not formed on the 5th day was regarded as acceptable, and a case in which red rust was formed was regarded as rejected, which was represented by "Bad (B)" in the table. Among the acceptable cases, a case in which red rust was not formed on the 5th day and was formed on the 10th day was represented by "Good (G)", a case in which red rust was not formed on the 10th day and was formed on the 20th day was represented by "Very Good (VG)", and a case in which no red rust was formed on the 20th day was represented by "Greatly Good (GG)" in the table.

TABLE 4

| Ex. No. | Presence of carbon concentration peak | Presence of carbon concentration bottom | Thickness of Fe—Ni alloy region (μm) | Thickness of Ni region (μm) | Ni coating weight (g/m$^2$) |
|---|---|---|---|---|---|
| A1 | Yes | Yes | 0.15 | 1.8 | 18 |
| A2 | Yes | Yes | 0.2 | 1.8 | 18 |
| A3 | Yes | Yes | 0.4 | 1.5 | 18 |
| A4 | Yes | Yes | 0.4 | 1.5 | 18 |
| A5 | Yes | Yes | 0.4 | 1.5 | 18 |
| A6 | Yes | Yes | 0.2 | 0 | 1.8 |
| A7 | Yes | Yes | 0.2 | 0.05 | 2.7 |
| A8 | Yes | Yes | 0.2 | 0.35 | 5.3 |
| A9 | Yes | Yes | 0.2 | 0.8 | 8.9 |
| A10 | Yes | Yes | 0.2 | 1.3 | 13.4 |
| A11 | Yes | Yes | 0.2 | 2.8 | 27 |
| A12 | Yes | Yes | 0.2 | 2.6 | 26 |
| A13 | Yes | Yes | 0.2 | 6.8 | 63 |
| A14 | Yes | Yes | 0.2 | 1.8 | 18 |
| A15 | Yes | Yes | 0.2 | 1.8 | 18 |
| B1 | No | No | 0.2 | 1.8 | 18 |
| B2 | No | Yes | 0.2 | 1.8 | 18 |
| B3 | No | No | 0.08 | 1.9 | 18 |
| B4 | No | Yes | 0.4 | 1.5 | 18 |
| B5 | No | No | 0.05 | 2 | 18 |
| B6 | No | Yes | 1.6 | 0.02 | 18 |
| B7 | No | Yes | 1.7 | 0 | 18 |
| B8 | No | No | 0.04 | 2 | 18 |
| B9 | No | Yes | 0.3 | 1.8 | 18 |

TABLE 5

| Ex. No. | Ni-Based Coating Adhesion in Processed Portion | Processed Portion Corrosion Resistance |
|---|---|---|
| A1 | VG | VG |
| A2 | VG | GG |
| A3 | VG | GG |
| A4 | VG | GG |
| A5 | VG | VG |
| A6 | VG | VG |
| A7 | VG | VG |
| A8 | VG | VG |
| A9 | VG | GG |
| A10 | VG | GG |
| A11 | VG | GG |
| A12 | VG | GG |
| A13 | VG | GG |
| A14 | VG | GG |
| A15 | VG | GG |
| B1 | B | Not evaluated |
| B2 | B | Not evaluated |
| B3 | B | Not evaluated |

TABLE 5-continued

| Ex. No. | Ni-Based Coating Adhesion in Processed Portion | Processed Portion Corrosion Resistance |
|---|---|---|
| B4 | B | Not evaluated |
| B5 | B | Not evaluated |
| B6 | G | B |
| B7 | G | B |
| B8 | B | Not evaluated |
| B9 | B | B |

As shown in Table 4, the presence of the carbon concentration peak 13 indicating a carbon concentration equal to or more than twice the carbon concentration of the thickness middle portion of the base steel sheet was confirmed in all of the examples. Then, these examples had high plating adhesion and high processed portion corrosion resistance.

On the other hand, in all of comparative examples, the presence of the carbon concentration peak 13 was not confirmed. These comparative examples had lower plating adhesion or processed portion corrosion resistance than the examples.

It is presumed that the reason why the carbon concentration peak 13 did not occur in Comparative Examples B1, B3, B5, and B8 was that the time to reach 345° C. to 595° C. was insufficient at the time of the preliminary heat treatment and the concentration of carbon did not sufficiently occur.

It is presumed that the reason why the carbon concentration peak 13 did not occur in Comparative Examples B2, B4, B6, and B7 was that the time to reach 345° C. to 595° C. at the time of the preliminary heat treatment exceeded 60 seconds and carbon was diffused to the vicinity of the surface of the Ni-plated steel sheet, resulting in the disappearance of the carbon concentration peak 13.

It is presumed that the reason why the carbon concentration peak 13 did not occur in Comparative Example B9 was that the average heating rate of the base Ni-plated steel sheet in the range of 595° C. to the maximum heating temperature was insufficient and carbon was diffused to the vicinity of the surface of the Ni-plated steel sheet, resulting in the disappearance of the carbon concentration peak 13.

INDUSTRIAL APPLICABILITY

According to the invention, it is possible to provide a Ni-plated steel sheet having high coating adhesion and high processed portion corrosion resistance and a method for manufacturing the Ni-plated steel sheet. Since the Ni-plated steel sheet contributes to, for example, reducing the size of a battery and increasing the capacity of the battery, it has high industrial applicability.

BRIEF DESCRIPTION OF THE REFERENCE SYMBOLS

1 Ni-plated steel sheet
11 Base steel sheet
12 Ni-based coating layer
13 Carbon concentration peak
14 Carbon concentration bottom
S1 Ni plating step
S2 Preliminary heat treatment step
S3 Annealing step

What is claimed is:

1. A Ni-plated steel sheet comprising:
    a base steel sheet; and
    a Ni-based coating layer that is disposed on a surface of the base steel sheet,
    wherein a distribution of a carbon concentration in a depth direction obtained by performing glow discharge emission spectrometry on the Ni-plated steel sheet has a peak indicating a carbon concentration that is at least twice a carbon concentration at a thickness middle portion of the base steel sheet in vicinity of an interface between the base steel sheet and the Ni-based coating layer, wherein the glow discharge emission spectrometry is conducted under conditions of an output of 30W, an Ar pressure of 3 hPa, and an analysis area of 4 mmφ, using high frequency mode of a Rigaku GDA750 glow discharge analyzer at four or more points to a depth of 30 or more μm into the Ni-plated steel sheet.

2. The Ni-plated steel sheet according to claim 1,
    wherein the distribution of the carbon concentration in the depth direction obtained by performing the glow discharge emission spectrometry on the Ni-plated steel sheet has a bottom which indicates a carbon concentration equal to or less than 0.8 times the carbon concentration of the thickness middle portion of the base steel sheet and is adjacent to a base steel sheet side of the peak.

3. The Ni-plated steel sheet according to claim 1,
    wherein the Ni-based coating layer includes a Fe-Ni alloy region that is disposed on the surface of the base steel sheet and includes 5 mass % or more of Fe and a remainder in which 90 mass % or more of a metal element is Ni and a Ni region that is disposed on the Fe-Ni alloy region and includes less than 5 mass % of Fe and a remainder in which 90 mass % or more of a metal element is Ni.

4. The Ni-plated steel sheet according to claim 1,
    wherein the Ni-based coating layer is a Fe-Ni alloy region that includes 5 mass % or more of Fe and a remainder in which 90 mass % or more of a metal element is Ni.

5. The Ni-plated steel sheet according to claim 1,
    wherein a Ni coating weight of the Ni-based coating layer is 1.5 to 65 g/m$^2$.

6. The Ni-plated steel sheet according to claim 1,
    wherein the Ni-plated steel sheet is used as a material for a battery container.

7. A method for manufacturing the Ni-plated steel sheet according to claim 1, the method comprising:
    plating a base steel sheet with Ni to obtain a base Ni-plated steel sheet;
    performing a preliminary heat treatment on the base Ni-plated steel sheet; and
    annealing the base Ni-plated steel sheet to alloy the Ni plating,
    wherein, in the preliminary heat treatment, a time when a temperature of the base Ni-plated steel sheet is within a range of 345° C. or higher and 595° C. or lower is set to 30 seconds or longer and 60 seconds or shorter, and
    in the annealing, an average heating rate of the base Ni-plated steel sheet in a range of 595° C. to a maximum heating temperature is set to 16° C./s or more, and the maximum heating temperature of the base Ni-plated steel sheet is set to 650° C. or higher and 850° C. or lower, and a time when the temperature of the base Ni-plated steel sheet exceeds 830° C. is set to 0 seconds or longer and 15 seconds or shorter.

8. The method for manufacturing the Ni-plated steel sheet according to claim 7,
wherein, in the annealing, the maximum heating temperature of the base Ni-plated steel sheet is set to 805° C. or lower, and a time when the temperature of the base Ni-plated steel sheet exceeds 800° C. is set to 0 seconds or longer and 4 seconds or shorter.

* * * * *